July 22, 1952 S. J. BEGUN 2,604,550

ERASE HEAD FOR USE WITH COMMERCIAL ALTERNATING CURRENT OR EQUIVALENT

Filed Jan. 21, 1947 4 Sheets-Sheet 1

INVENTOR.
S. J. BEGUN

BY

Pirelles & Stearns
ATTORNEYS

July 22, 1952 S. J. BEGUN 2,604,550

ERASE HEAD FOR USE WITH COMMERCIAL ALTERNATING CURRENT OR EQUIVALENT

Filed Jan. 21, 1947 4 Sheets-Sheet 2

INVENTOR.
S. J. BEGUN

BY

Pinelas & Greene
ATTORNEYS

July 22, 1952 S. J. BEGUN 2,604,550

ERASE HEAD FOR USE WITH COMMERCIAL ALTERNATING CURRENT OR EQUIVALENT

Filed Jan. 21, 1947 4 Sheets-Sheet 3

INVENTOR
S. J. BEGUN
BY
Pinelas & Greene
ATTORNEYS

INVENTOR.
S. J. BEGUN

BY

ATTORNEYS

UNITED STATES PATENT OFFICE 2,604,550

ERASE HEAD FOR USE WITH COMMERCIAL ALTERNATING CURRENT OR EQUIVALENT

Semi Joseph Begun, Cleveland Heights, Ohio, assignor to The Brush Development Company, Cleveland, Ohio, a corporation of Ohio Application January 21, 1947, Serial No. 723,374

2 Claims. (Cl. 179—100.2)

This invention relates to magnetic recording. In magnetic recording processes in which A. C. biasing is used the magnetic record track upon which the record is made is in many cases first magnetically neutralized so as to minimize the presence of any residual disturbing magnetic flux.

Hitherto, magnetic recording with A. C. bias has usually been effected with a specially generated strong high frequency erasing field so as to permit magnetic neutralization of the record track at the speed with which it is being passed across the magnetic recording head and while it is so passed. This erasing field has usually been generated by a magnetic core which generally has a very small non-magnetic field-producing gap. The speed with which the record track moves past the recording head for suitable recording is generally so high that only high frequency fields have been found effective for squeezing the necessary cycles of decaying magnetic field into the small gap field while each elemental portion of the record track is moving through it.

To overcome the large eddy current losses due to the high frequency currents in the erasing head and to insure effective demagnetization, which requires the magnetic saturation of each elemental portion of the record track before it is subjected to a decaying demagnetizing field, large amounts of high frequency currents are required for erasing. When using such high frequency erasing, the eddy current losses are large enough to rapidly overheat the erasing head and contacting record track. The record tracks are adversely effected by such heating, especially if the record tracks are of the non-metallic type having a bonded layer of permanently magnetizable particles, such as are described in the Kornei applications, Serial Numbers 685,092 and 685,093, filed July 20, 1946, the latter application having been abandoned.

Among the objects of this invention is a magnetic transducing apparatus in which erasing may be effected with low frequency erasing fields while the record track is moving at the normal forward speed used for recording or reproducing.

The foregoing and other objects of the invention will be best understood from the following description of exemplifications thereof, reference being had to the accompanying drawings wherein Fig. 1 is a diagrammatic plan view of a portion of a magnetic transducing apparatus having a low frequency erasing head construction according to the invention;

Figure 5A:
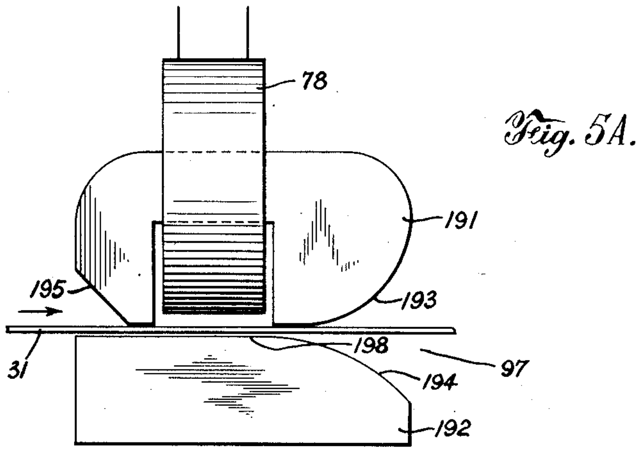
Figure 5B:
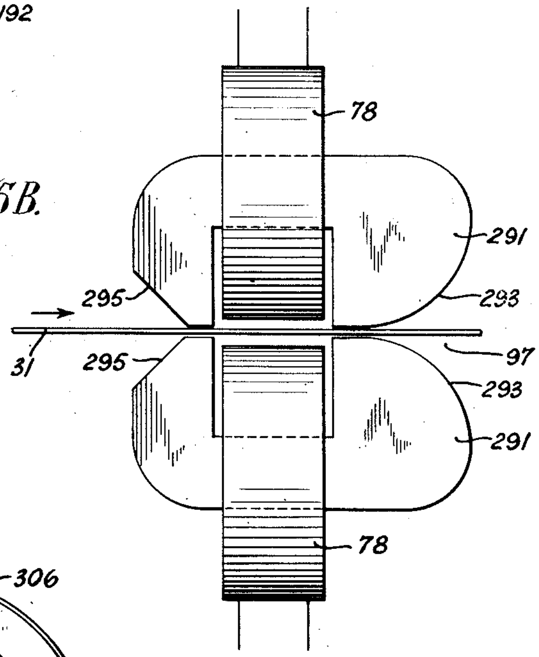
Figure 5C:
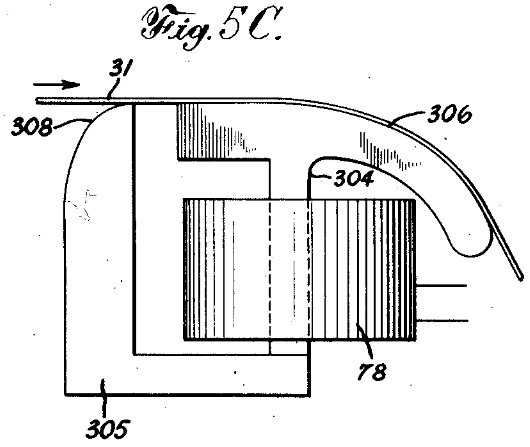
Figure 6:
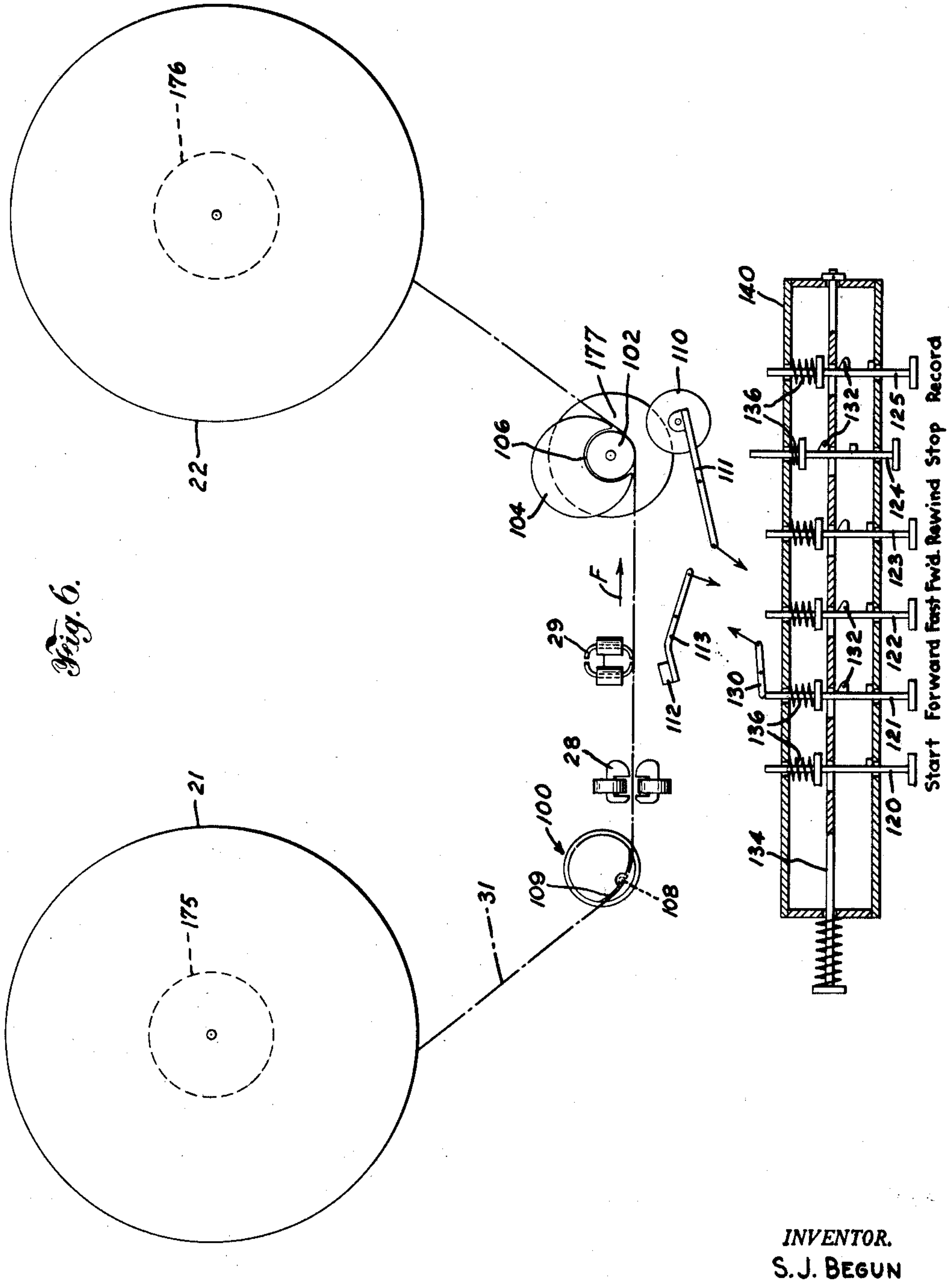

Figs. 5, 5*a*, 5*b* and 5*c* are top views of still further forms of low frequency erasing core according to the invention; and Fig. 6 diagrammatically illustrates a further magnetic recorder construction of the invention embodying a low frequency erasing core.

Figure 1:
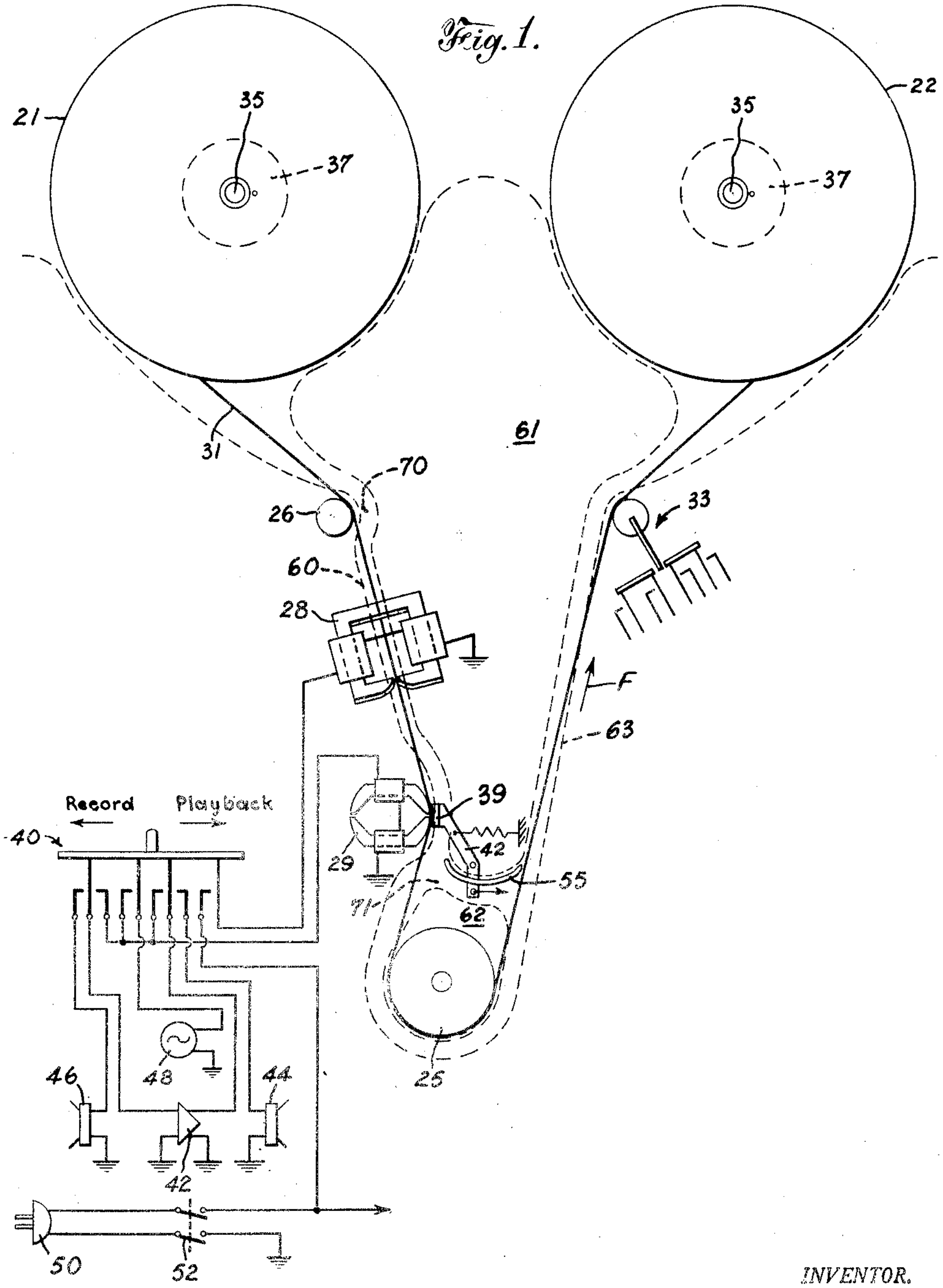

Referring now specifically to Fig. 1 there is shown a magnetic transducing apparatus including a supply reel 21 from which a magnetic record track 31 is unreeled and passes over a guide roller 26, then through an erasing core 28, over a recording-reproducing core 29, a capstan roller 25, and a limit switch assembly 33 to be wound on a take-up reel 22. The reeling mechanism shown is of the type described in the copending Dank application Serial No. 690,878, filed August 16, 1946, now Patent No. 2,535,486, issued December 26, 1950, in which the capstan and the reels are driven by one or more conventional electric motors supplied with electric power from a conventional alternating current power line, such as a 60 cycle, 110 volt line.

The reels 21 and 22 may be suitably mounted on shafts 35 as by resting on supporting collars 37 fixed to the shafts. The capstan roller 25 frictionally engages the record track along a large portion of its circumference and has sufficient rotational inertia, as to insure constancy of the rate of movement of the record track over the magnetic heads. The capstan roller may have its periphery coated with a special friction coating to improve its action.

A pad 39 of resilient material such as felt is shown as mounted on a pivoted lever 42, so that the pad may be used to press the record track into stable magnetic linkage with the recording reproducing core 29. The lever 42 may be biased to a retracted position from which it may be suitably actuated to the pressing position shown as by means of a link diagrammatically indicated by the arrow affixed to the lever.

The erasing core 28 and the recording-reproducing core 29 have windings each of which is shown as having one terminal grounded. The other terminals of these windings are shown as connected through a switch assembly 40 to the various elements of a recording and reproducing system. The switch assembly 40 is shown as including 4 blades mechanically connected so as to be actuated together from a left hand "record" position to a right hand "playback" position. In the "playback" position the windings of the erasing core 28 remained disconnected and the windings of the recording-reproducing core 29 are connected to the input of the amplifier 42, the output of which is simultaneously connected to the signal reproducing device such as loudspeaker 44.

In the "record" position the input of amplifier 42 is connected to the signal source, such as the microphone 46 and the output of the amplifier is connected to the windings of the recording-reproducing core 29 together with the output of high frequency oscillator 48. Simultaneously the windings of erasing core 28 are connected to a low frequency source of current such as the regular 60 cycle supply line as indicated by the plug 50. A switch 52 may be inserted in the power supply line and have "on-off" positions for controlling the operation of the apparatus. The above circuit connections are completed by the ground connections shown.

As indicated by the arrow in the power supply line, power take off connections may be provided to supply power to the amplifier, oscillator and the various impelling means employed to produce the desired reeling operations. The shafts 35 of the reels 21 and 22 as well as the capstan roller 25 may for example be provided with impelling means in the form of one or more electric motors, actuated by the power connection.

The high frequency oscillator 48 need not provide any substantial amount of high frequency power inasmuch as it is only needed for the A. C. biasing of the recording currents, as is well known. Accordingly, this oscillator may merely include a single vacuum tube in a conventional hook-up. This oscillator tube may even be one of the components of a multi-component vacuum tube, such as a combined triode-pentode tube, the pentode being used in the amplifier 42 and triode in the oscillator 48, the oscillator and amplifier power supply which conventionally includes high voltage direct current, may include a rectifier also fed by the alternating current line. This rectifier may if desired be a full-wave rectifier in which case the 120 cycle ripple or A. C. component of the rectified currents may when freed from any D. C. components, be used to provide and feed a 120 cycle A. C. erasing current to the erasing core 28.

For simpler threading of the record track 31 along its record track guide path there may be provided a set of cover plates 60, 61, 62 and 63 as represented by the dash line outlines. These cover plates may be placed above the level of the record track guide path and so spaced from each other as to provide a channel 70 into which the record track may be placed. The end of the record track may be unwound from the supply reel 21, placed in the threading channel and then secured to the take-up reel 22. The application of impelling forces to effect reeling will cause tensioning forces to appear in the record track and will move the record track into its proper guide path as illustrated. The lever 42 is retracted from the channel 70 when the threading is effected. A high speed reeling operation, such as for rewinding of the record track or for reeling it rapidly in a forward direction to find a desired spot in a recording, may be effected by lifting the record track out of the channel surrounding the capstan roller and placing this portion of the record track into the channel 71 in which is mounted a highly polished guide 55. Such shifting of the record track disconnects it from the high-inertia capstan roller 25 and permits it to move at fairly high speed with little friction over the guide 55. The channels 70 and 71 may be enlarged adjacent their intersections to provide greater accessibility of the record track to the operator's fingers for simple and rapid changing of the record track guide paths. If desired a roller may be substituted for fixed guide 55.

Figures 2, 3, 3A, 4, 5:
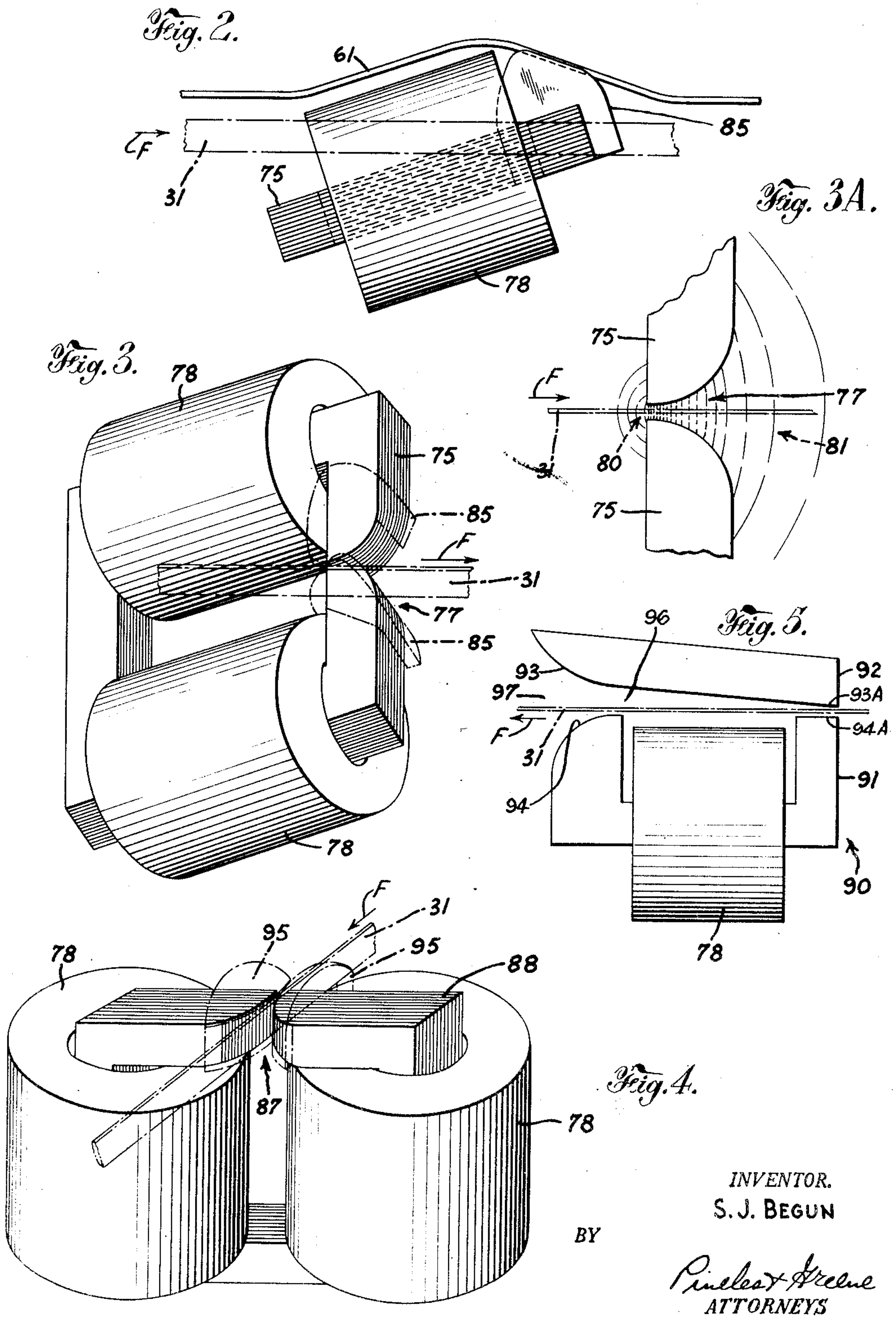
Figs. 2 and 3 are side and perspective views of one form of low frequency erasing core embodying the invention.
Fig. 3A is an enlarged fragmentary view of the erasing head showing the magnetic field in the gap.
Fig. 4 is a perspective view of another form of low frequency erasing core embodying the invention.

One form of a low frequency erasing core construction is illustrated in Figs. 2, 3 and 3A. The magnetic portion of the core 75 is shown as composed of several laminations of highly permeable magnetic metals, such as silicon steel. The outline of the laminations may be generally square or rectangular in plan, one arm having a tapered slot or gap 77. Around one or more of the other arms, windings such as the coil 78 may be placed and connected so that the feeding of a low frequency current through the winding will produce a low frequency magnetic field in the gap 77. The coils 78 may be mounted in any suitable manner such as by constructing the laminations in sectional form so that the sections may be inserted into the finished coils to produce the completed core.

The gap 77 should be so shaped that at one portion, indicated at 80 in Fig. 3A, the field intensity as represented by the closely spaced dash lines connecting the pole pieces is high enough to saturate the record track 31, and in the direction of motion of the record track the field intensity gradually varies from the region 80 to the region 81 where the field intensity and flux density is so low, as to have substantially no magnetic effect on the record track. The distance from region 80 to region 81 must be chosen so that in the time the record track 31 moves across this distance at least about three cycles of field alternations take place. The magnetic field thus produced will have suitable decay characteristics for effectively demagnetizing each elemental portion of the record track 31 as they pass through it. As shown in Figs. 2 and 3 the core 75 may be inclined at an angle with respect to the plane in which the record track 31 moves so as to prevent the imperforate core section opposing the gap 77 from obstructing the record track passage.

To simplify and insure the threading of the record track 31 into the gap 77 which includes a narrow zone 80, a pair of threading guides 85 may be mounted so as to extend from the gap regions of the core 75 up to the level of the top of the cover plates, as more clearly shown in Fig. 2 which is a side view with plate 60 removed. The threading guides 85 may be saddle shaped, as shown, for easier mounting.

Fig. 4 illustrates another form of low frequency erasing core in accordance with the invention. This core construction is generally similar to that of Figs. 2 and 3, differing however in that the gap 87 of the core 88 is so constructed that the field intensity gradually decays along a direction at right angles to the plane of the core. This permits the simpler positioning of the core at right angles to the plan of movement of the record track 31, as indicated. The gap in each of the laminations of the core 88 must have a different spacing so as to provide the same general field distribution indicated in Fig. 3A.

Fig. 5 illustrates a further form of low frequency erasing head embodying the invention. The magnetic portion of the core 90 of this construction is shown as including a generally U-shaped portion 91 and a bar-shaped portion 92, the ends of the bar 92 being adjacent to the ends of the U-shaped portion as shown. The coil 78 may be mounted around one or more of the legs of the U-shaped portion 91. The record track 31 is arranged to travel in a guide path extending in the spaces between the ends of the bar-shaped portion 92 and the ends of the U-shaped portion. One end of both the bar-shaped portion 92 and the U-shaped portion 91 may be provided with sloping surfaces 93 and 94 respectively so shaped that the field distribution between the region of surface 93 and the surface 94 varies smoothly from a strong zone 96 down to substantially zero at a zone 97. The zones being spaced a distance sufficient to provide about three cycles of decaying demagnetizing field for each elemental portion of the record track passing through it. The other ends 93A and 94A of the bar 92 and U 91 may be spaced more closely than at zone 96 to provide a magnetic field strong enough to saturate each elemental portion of the tape and the tape movement may be adjusted so that the tape passes through the zone 96 then through the decaying portion and finally through the zone 97.

If desired the field existing in the zone 96 may be relied on for producing the saturating portion of the field, in which case the record track need not pass between the ends 93A and 94A.

Adjacent the record track receiving gaps, the cores of Figs. 4 and 5 may also be provided with threading guides such as the guides 95 shown in Fig. 4. If desired the two portions of the core 90 may be movably positioned so as to allow wide spacing during threading of the record track and effective close spacing for erasing.

The record track erased according to the invention may be either in the form of wire or tape. The recording-reproducing core may be of any suitable construction such as those shown in the Begun application, Serial Number 688,738, filed August 6, 1946, now Patent No. 2,513,617, issued July 4, 1950, or the Kornei application, Serial Number 688,034, filed August 2, 1946, now Patent No. 2,523,576, issued September 26, 1950.

Fig. 5*a* shows another form of low frequency erasing head which has been found very satisfactory. This construction includes a U-shaped core member 191 and a bar-shaped core member 192 generally similar to those shown in Fig. 5. The leading elements of the U-shaped core portion 191 which are the first to receive the record track 31 are however shown as cut away as indicated at 195 and the bar-shaped portion 192 is not tilted so that it provides a record track guiding surface 198.

Fig. 5*b* illustrates another highly practical erasing core construction in which identical core portions are used. The core portions 291 may be identical with the core portions 191 shown in the construction of Fig. 5*a* and are shown as symmetrically placed to provide tapered leading surfaces 295, 295 and curved departing surfaces 293, 293 for the record track 31. With the construction of Fig. 5*b* it has been discovered that good erasing may be affected with the record track moving past the gap regions of the core either in the direction indicated by the arrow or in the reverse direction. The record track movement in the direction of the arrow appears to provide slightly better erasing, the coils 78 being connected to provide magnetic fields that reinforce each other.

It has also been discovered that with the constructions shown in Fig. 5, 5*a* or 5*b* better erasing is produced with the record track contacting the core faces as against riding freely through the gaps. When using record tracks in the form of paper or plastic tape having a bonded stratum of permanently magnetizable particles, as disclosed in the Kornei application, it is also advantageous to erase in the construction shown in Figs. 5 and 5*a* with the magnetizable stratum facing the U-shaped core portion 91 or 191 rather than the bar-shaped portion 92 or 192.

Fig. 5*c* also illustrates a suitable low frequency erasing core having two core portions 304 and 305. The core portion 304 is shown as having the shape of a distorted T the upper surface of which provides a curved guide surface 306 for the record track. The second core portion 305 is in the general shape of an L providing a tapering record track leading surface 308. The leading surface provides a concentrated magnetic field at its record track engaging tip. The curved guiding surface 306 functions essentially as a magnetic by-pass for the main magnetic circuit extending around the almost completely closed path formed by the other arms of the T member 304 and the arms of the L member 305. The diminished magnetic field adjacent the surface 306 appears to decay in a suitable manner.

The magnetic core constructions of Fig. 2 through 5*c* may be made of silicon steel of not too many laminations which need not be very thin. Laminations in the neighborhood of 0.014 inch thick are suitable and do not heat up excessively.

The constructions of Figs. 5, 5*a* and 5*b* may have the coils 78 wound directly on integral core portions 91, 191 or 291 for added simplicity but if desired these U-shaped core portions may be cut so that pre-wound coils may be mounted. The construction of Fig. 5*b* has the further advantage of requiring only a single type of core lamination, an important economy feature.

It is apparent that the arrangement of the invention permits simple demagnetizing of the record track without requiring a separate reeling operation or a careful threading of the record track into or through a demagnetizing core. Although the record track may be reeled through for erasing only, the erasing may also be accomplished during a recording operation, no special handling of the track being then required. The apparatus may ordinarily be arranged so that erasing is automatically effected during recording to insure recording on properly prepared record track.

As set forth in the co-pending Begun application Serial Number 703,343, filed October 15, 1946, now Patent No. 2,535,481, issued December 26, 1950, magnetic neutralization is accomplished by magnetic saturation followed by exposure of each elemental portion of the record track to a decaying alternating magnetic field having the required number of decaying cycles. At the same time the erasing core need not be excessively large. Record tracks moving at the rate of about 12 inches per second for example, will be subjected to about three complete cycles of decaying alternating magnetic field with a demagnetizing core having a dimension, in the direction of record track movement, of about 0.6 inch. With smaller track speeds or higher frequencies of magnetic field alternations an erasing head of even smaller dimensions will be suitable, although it may be preferred to provide extra decaying cycles to insure good demagnetization. Minor core variations such as are ordinarily unavoidable in a commercial production technique might otherwise seriously affect the erasing operation.

Additionally the arrangement of the invention will automatically draw the record track into its proper guide path and hold it there for suitable erasing even though it is originally merely placed alongside the guide path.

At the low frequencies used with the invention, the heating of the erasing core is greatly diminished, so much so in fact, that the core construction may be silicon steel and need not be the expensive highly permeable special alloys. The low frequencies may be produced, if desired by conventional frequency doubling, tripling or quadrupling of the regular 60 cycle power supply.

Fig. 6 illustrates another form of magnetic transducer. According to the invention in this form, the record track 31 is fed from the supply reel 21 and moved over a limit switch 100 then along a guide path in which it is magnetically linked with the erasing core 28 and the recording-reproducing core 29 and around a capstan roller 102 after which it is wound up on the take-up reel 22. The capstan roller 102 may be a thin shaft rotated at high speed to produce the required constant reeling speed of the track 31, and may be backed by a rigidifying support 104 shaped to provide a recess 106 in which the rotating shaft 102 which may be thin enough to be non-rigid is securely supported and maintained. The support 104 may be lubricated as by forming it of suitable lubricating composition, such as conventional lubricant-impregnated metal material or graphite. The support 104 may be so shaped as not to contact the capstan shaft 102 along those portions which engage the record track 31, to prevent contamination of the track by the lubricant.

The limit switch 100 provides a record track guide channel 109 together with a switch actuating member 108. Between the limit switch 100 and the capstan shaft 102 a fairly fixed record track guide path is established along which the record track may be reeled either in a forward direction for recording or reproducing, or in the opposite direction for rewinding. The limit switch assembly and/or the capstan shaft need not be used as guide surfaces for changing the record track guide path direction and guide rollers may be used for this purpose in which case the limit switch assembly and/or capstan shaft may be placed along generally straight portion of the guide path. The capstan shaft 102 and the pole faces of the core 29 may be burnished to provide an exceedingly smooth surface along which the record track may slide with very little frictional resistance. Rewinding and fast forward winding operations which are effected at high speed can accordingly be maintained without changing the record track guide path.

For recording or reproducing, constancy of record track movement and magnetic linkage with the core 29 is required. The roller 110 and the pad 112 mounted on lever arms 111, 113 respectively, are provided and mechanically connected to the control mechanism so that when the apparatus is set for recording or reproducing, the roller and pad are pressed respectively toward the capstan shaft 102 and the core 29. These pressing members may be biased so as to be retracted away fom the record track guide path except when actuated by the control mechanism. A roller may be substituted for the pad 112 if desired.

A control unit 140 shown as a push rod assembly is provided for operation with associated switches (not shown) to set the apparatus into the various operative conditions for effecting the desired reeling and transducing functions. Six push rods 120, 121, 122, 123, 124 and 125 are shown labelled respectively: Start, Forward, Fast Forward, Rewind, Stop and Record.

The pressing members are shown as actuated by a pivoted lever 130 operated by the Forward push rod 121, which must be moved inwardly to set the apparatus for a slow forward reeling operation as required for recording or reproducing.

Push rods 121 through 125 may be mounted as a conventionally interlocked assembly of push rods in which any of the rods may be pushed inwardly to move from outward position in which the rods 121, 122, 123 and 125 are shown to inward positions in which the rod 124 is shown. In their inward position the rods are latched as by the latch cam 132 on the rods engaging the biased plate 134. The inward actuation of any push rod to its inward position causes its latch cam 132 to release the latch plate 134, automatically unlatching any inwardly latch push rods to permit them to be returned to their outward retracted positions under the influence of the biasing springs 136. The Start push button 120 is not part of the interlocking push button assembly and is merely an outwardly biased rod which is moved to its inner position for starting any of the reeling operations as indicated below.

Reeling may be effected by connecting the reels 21, 22 and the capstan roller 25 or 102 to one or more motors. Three different motors may be employed, as indicated by 175, 176 and 177 in Fig. 6, connected so that the motor 175 may impel the supply reel 21 in the rewind direction, motor 176 impels the take-up reel in the forward direction and the motor 177 impels the capstan 25 or 102 in the forward direction. The motors may be of the low power A. C. induction type. The constant speed feature enables the direct and simple driving of the capstan, whereas the low power permits suitable forward reeling with a direct connection between the take-up motor 176 and the take-up reel 22. Although the effective diameter on which the record track is wound on the take-up reel 22 varies as the amount of wound record track on this reel changes, the take-up motor 176 does not control the linear speed of the record track, but merely acts to take up the slack between the capstan and the take-up reel. The frictional engagement between the record track and the capstan of Fig. 1 or the pressing engagement of Fig. 6 insures the forward reeling at the desired constant speed. The poor leverage of the take-up motor 176 acting along the relatively large effective diameter of the take-up winding permits the record track feed of the capstan to control the rotation of this motor.

A high speed reeling in the apparatus of Fig. 6 is accomplished with the pressing members 110 and 112 withdrawn to their retracted positions. The capstan shaft 102 and the core 29 may be highly burnished to provide so little resistance to the reeling of the record track 31 that in high speed forward reeling the take-up motor is permitted to attain a speed much higher than its speed during slow forward reeling so that a desired portion of the recording on the record track may be quickly reached. A record track which requires thirty (30) minutes for complete reeling at a slow forward speed may, for example, be completely reeled at high speed in times as short as one minute or less. The take-up motor should be so arranged as to be capable of providing a take-up reel speed sufficient for take-up at the highest speed desired. The rewind reeling may be effected in a similar manner and at the same high speed.

The circuit connections between the control mechanism such as the assembly 140 and the tape impellers in the construction of Fig. 1 or Fig. 6 may be of any suitable type. One such suitable control circuit system is shown in the co-pending Begun application, Serial No. 723,735, filed January 23, 1947; another is shown in the co-pending Dank application, Serial No. 690,878, filed August 16, 1946, now Patent No. 2,535,486, issued December 26, 1950.

The capstan arrangement shown and described in connection with Fig. 6 is not a part of the present invention, being the invention of A. L. W. Williams.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In a magnetic record transducing apparatus for recording signals of the audio frequency range on successive elements of a substantially demagnetized permanently-magnetizable elongated record track: an erasing head comprising a winding and a loop-like elongated magnetic core interlinked with said winding and confining within said core the major part of the flux induced by electric current in said winding, said core having confronting pole portions separated by a gap-space materially wider than the thickness of said record track and including means whereby said track is insertable into said gap-space from a lateral side of said core and removable from said gap-space; means for driving said record track at a given speed during recording and at said same given speed through said gap-space in a forward direction along a field-path of said gap-space which is at most about two inches long, said means for driving including an alternating-current motor energizable with 60 cycle-per-second alternating electric current; said gap-space being relatively narrow at an initial region and increasing in width in the forward direction of said record track motion; means for connecting said windings to 60 cycle-per-second alternating electric current to produce in each elemental portion of the record track as it moves through the said field path at said given speed an alternating magnetic flux field of at least three wave lengths, and to produce a field intensity at said initial region of maximum intensity sufficient to magnetically saturate each successive elemental portion of the record track passing therethrough and to produce a relatively low field intensity and of such direction as to substantially neutralize each successive elemental portion of the said record track as it leaves said field path.

2. A demagnetizing device including: a magnetic record member; a C-shaped core member of high magnetic permeability and low magnetic retentivity, said core including a nonmagnetic gap which smoothly increases in length from a first dimension which is slightly greater than the smallest dimension of said record member to a dimension greater than said first dimension; a coil mounted on said core, means whereby a source of commercial alternating current is utilized to generate an alternating flux in said gap, said means including means to directly connect said coil to said source; means whereby successive elements of said record are passed through said gap in the direction of increasing length so that each of said elements is subjected to at least several alternations of the flux generated in said gap by said current.

SEMI JOSEPH BEGUN.

REFERENCES CITED

The following references are of record in the file of this patent:

UNITED STATES PATENTS

| Number | Name | Date |
|---|---|---|
| 1,640,881 | Carlson | Aug. 30, 1927 |
| 1,837,586 | Rhodehamel | Dec. 22, 1931 |
| 2,207,392 | Zuschlag | July 9, 1940 |
| 2,230,913 | Schuller | Feb. 4, 1941 |
| 2,351,005 | Camras | June 13, 1944 |

FOREIGN PATENTS

| Number | Country | Date |
|---|---|---|
| 691,711 | France | Oct. 24, 1930 |